US007918423B2

(12) United States Patent
Haight

(10) Patent No.: US 7,918,423 B2
(45) Date of Patent: Apr. 5, 2011

(54) MOBILE ANTENNA SUPPORT

(75) Inventor: Richard Haight, Courtice (CA)

(73) Assignee: ASC Signal Corporation, Smithfield, NC (US)

( * ) Notice: Subject to any disclaimer, the term of this patent is extended or adjusted under 35 U.S.C. 154(b) by 515 days.

(21) Appl. No.: 12/126,448

(22) Filed: May 23, 2008

(65) Prior Publication Data

US 2008/0290228 A1 Nov. 27, 2008

Related U.S. Application Data

(60) Provisional application No. 60/940,050, filed on May 24, 2007.

(51) Int. Cl.
*F16M 11/14* (2006.01)

(52) U.S. Cl. ....... 248/183.2; 312/111; 410/85; 410/100; 220/23.6

(58) Field of Classification Search .................. 206/503, 206/504; 220/1.5; 248/188.1, 188.6, 346.01, 248/618, 678; 312/111; 343/880, 882, 881
See application file for complete search history.

(56) References Cited

U.S. PATENT DOCUMENTS 3,776,169 A * 12/1973 Strecker .......................... 410/77
3,811,747 A 5/1974 Levin
3,980,185 A * 9/1976 Cain ............................ 206/509
2006/0099043 A1 * 5/2006 Hsieh .............................. 410/85

OTHER PUBLICATIONS

Gigasat Product Brochure: FA-370 Antenna; downloaded in the US from URL: http://www.gigasat.com/products/flyawayantennas_new.htm on May 20, 2008. Original publication date unknown.

* cited by examiner

*Primary Examiner* — Terrell McKinnon
*Assistant Examiner* — Daniel J Breslin
(74) *Attorney, Agent, or Firm* — Babcock IP , PLLC

(57) ABSTRACT

An antenna support, including a top transit case stacked upon a bottom transit case and an antenna mounting surface stacked upon the top transit case. The bottom transit case, the top transit case and the antenna mounting surface retained by a plurality of turnbuckle(s), each of the turnbuckle(s) coupling between a respective attachment point of the bottom transit case and the antenna mounting surface. A length of the turnbuckle(s) adjustable to clamp the top transit case against the bottom transit case and the antenna mounting surface against the top transit case.

19 Claims, 8 Drawing Sheets

MOBILE ANTENNA SUPPORT

CROSS REFERENCE TO RELATED APPLICATIONS

This application claims the benefit of U.S. Provisional Patent Application No. 60/940,050, titled "Mobile Antenna Support", filed May 24, 2007 by Richard Haight and hereby incorporated by reference in its entirety.

Also demonstrative of related aspects of a Mobile Antenna System that incorporates elements of the invention are two US Utility Patent Applications titled 1) "Segmented Antenna Reflector" and 2) "Rotatable Antenna Mount", both applications by Richard Haight inventor of the present invention, both filed May 23, 2008 and both hereby incorporated by reference in their respective entirety.

BACKGROUND

Antennas are typically mounted upon a rigid antenna support. The antenna support positions the antenna in view of the target signal and maintains the selected antenna orientation despite environmental factors such as wind, rain and or blowing debris. For mobile antennas, the antenna support system is a balance between rigidity, weight, ease of assembly and cost.

Prior mobile antenna systems have utilized a plurality of transit cases to house the antenna components and or related electrical equipment during transport. By fastening the transit cases together, an antenna support structure is created; eliminating the need to supply additional structural elements that otherwise would be required. The prior fastening systems for the transit cases utilized through-hole fasteners between the top and bottom surfaces of stacked transit cases. Through-hole fastening of the transit cases is time consuming to assemble, introduces leakage opportunities and localized weak areas to the transit cases, requiring significant reinforcing of the transit case wall structure, lid, hinges and latches. The resulting transit cases have a significantly increased overall weight and cost of manufacture.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with the general and detailed descriptions of the invention appearing herein, serve to explain the principles of the invention.

DETAILED DESCRIPTION

The inventor has recognized that stacked transit cases with simplified structural requirements may be rapidly interconnected by applying external clamping members that further incorporate connection nodes for horizontal stiffening, outrigger stabilizing and or leveling struts.

Figure 1:
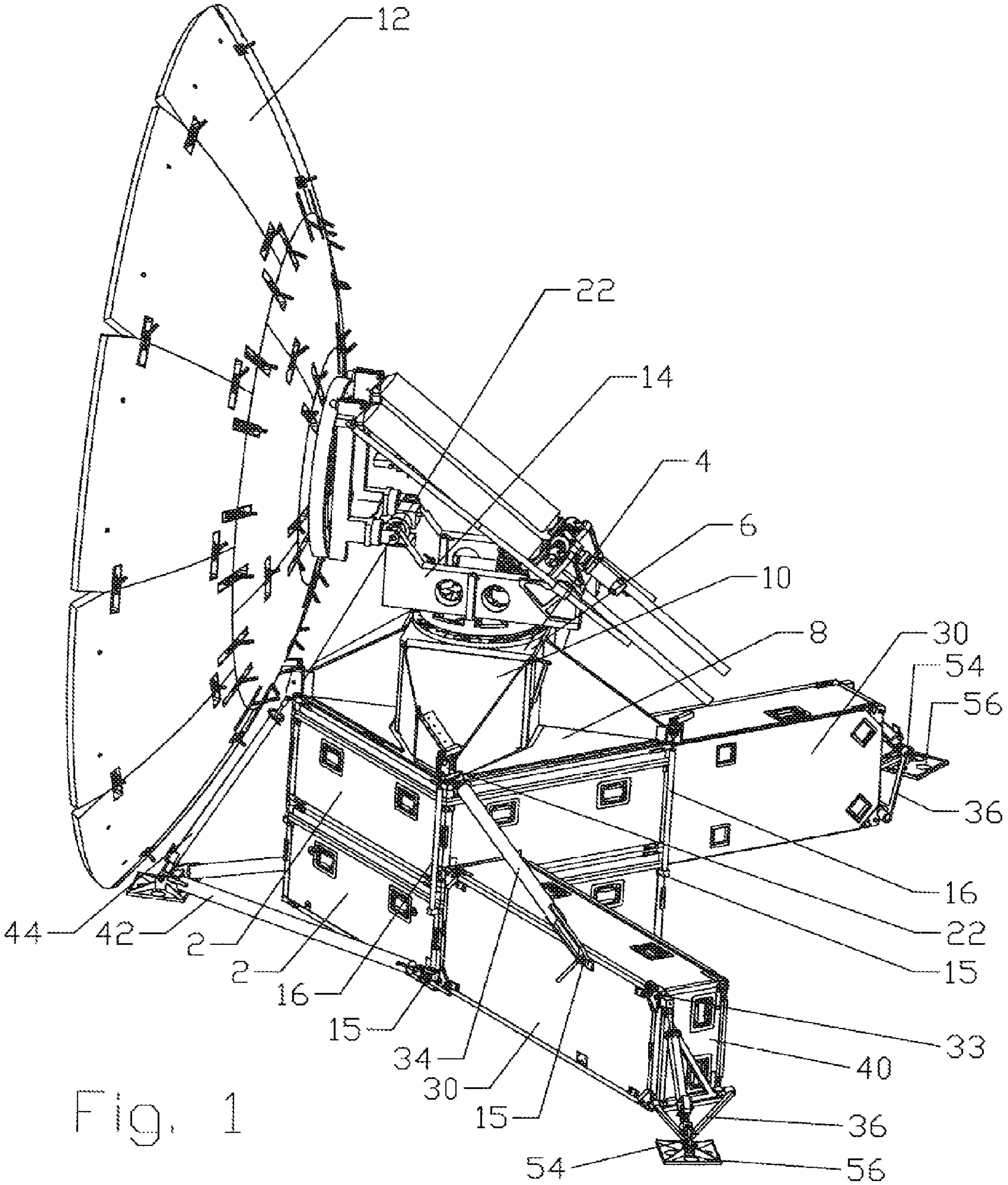
FIG. 1 is a schematic isometric view of an exemplary antenna and antenna support.
Figure 2:
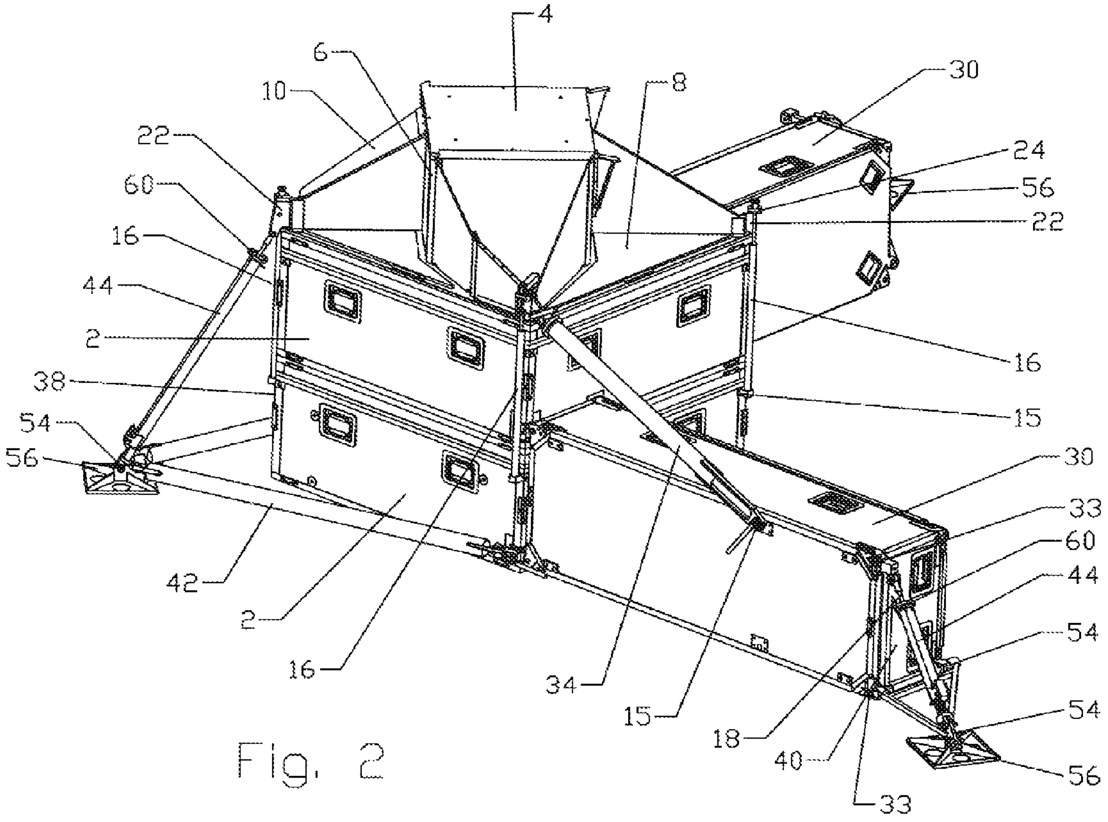
FIG. 2 is a schematic isometric view of the antenna support of FIG. 1.

An exemplary antenna support 1 is demonstrated in FIGS. 1 and 2. A plurality of transit case(s) 2 used to transport the antenna and support system components are emptied at the installation site, resealed and joined together to form a rigid core having an antenna mounting surface 4 at the top. The antenna mounting surface 4 may be formed from area dividers and or sub boxes from the transit case(s) 2 with a raised central mount 6 coupled to the corners of a top plate 8 via angled reinforcing panel(s) 10. As shown in FIG. 1, the raised central mount 6 provides interference clearance for a reflector dish 12 and antenna positioning linkage 14 with minimal loss of structural integrity.

The transit case(s) 2 may be adapted according to priorities between cost, weight and strength. For example, where weight and strength are prioritized, the transit case(s) 2 may be formed as a monoque carbon fiber core with metal, for example aluminum, edge framing and attachment point(s) 15. Each of the attachment point(s) 15 are preferably configured as exterior facing latches and threaded or snap attachment cavities without through holes to the transit case 2 interior.

Figure 3:
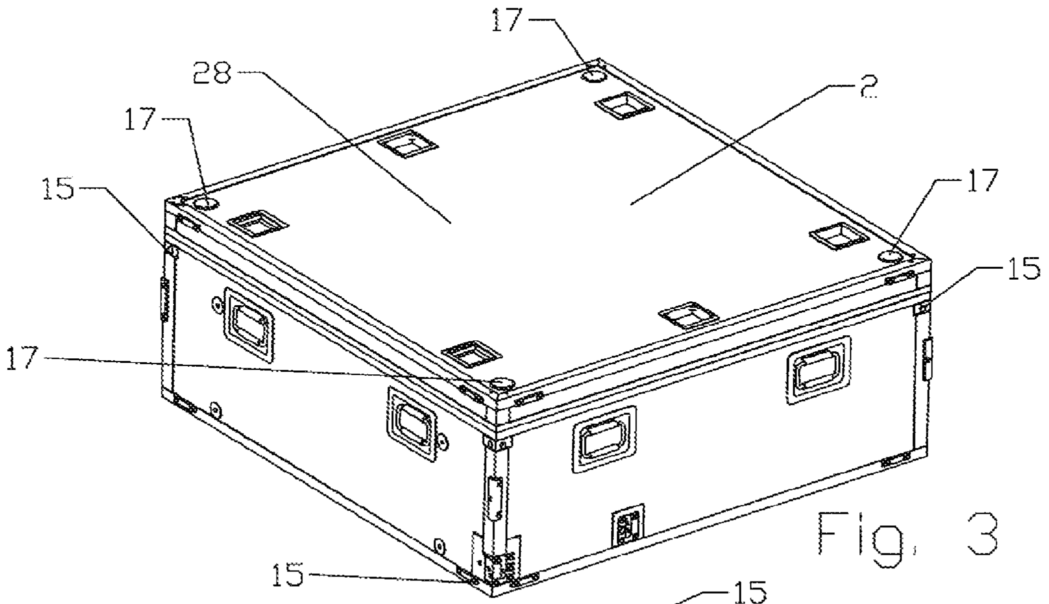
FIG. 3 is a schematic isometric top view of a transit case.
Figure 4:
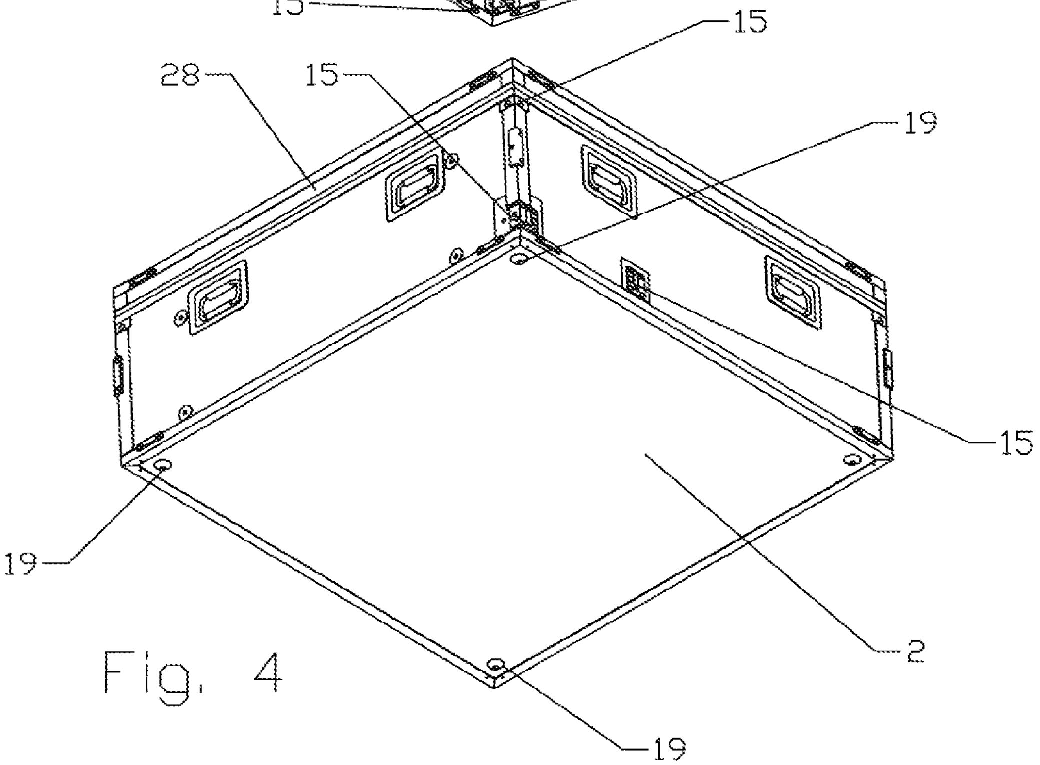
FIG. 4 is a schematic isometric bottom view of a transit case.
Figure 5:
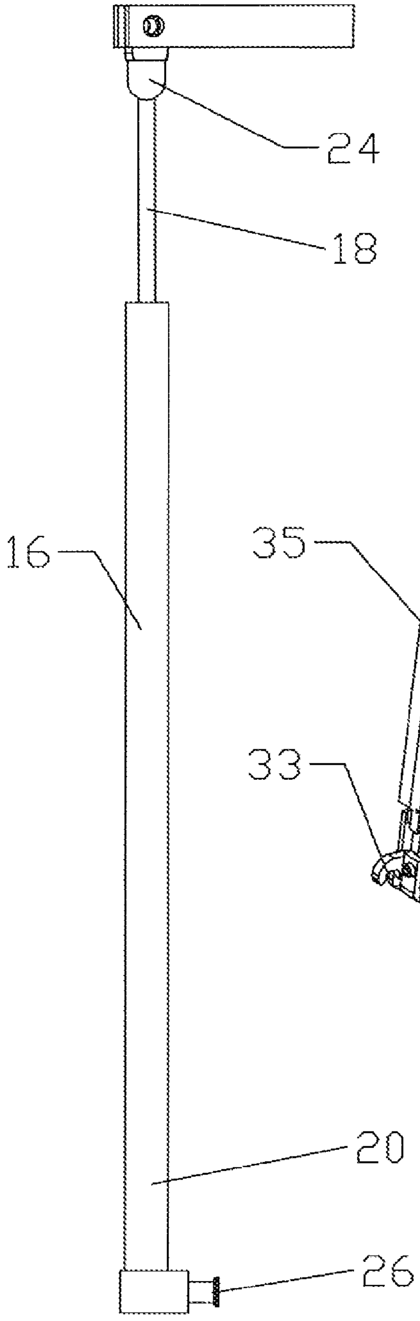
FIG. 5 is a schematic isometric view of a turnbuckle.

The transit case(s) 2, as shown in FIGS. 3 and 4, may include top socket(s) 17 positioned to receive bottom feet 19 for transit case 2 alignment one upon the other. As best shown in FIG. 5, a plurality of clamp(s), here applied as turnbuckle (s) 16 positioned at each side corner couple the stacked transit case(s) 2 to one another.

The turnbuckle(s) 16 have a telescoping configuration with a tension strength characteristic. An inner portion of the turnbuckle(s) 16 is movable in and out of a rod portion 20. For example, the inner portion may be a threaded portion 18 that threads in and out of the rod portion 20. A top end seats upon the selected clamping member and or connection node 22, demonstrated in the present embodiment via a shoulder pin 24 or washer of the threaded portion 18. The turnbuckle(s) 16 extend from the top plate 8 to attachment point(s) 15 on the bottom transit case 2. The turnbuckle 16 attachment point(s) 15 may be formed as a snap in connection between a coupling pin 26 and corresponding reinforced attachment point 15 of the transit case 2. Alternatively, connections to attachment point(s) 15 may be via threaded fasteners. The turnbuckle 16 attachment point(s) 15 are located on the bottom portion of the bottom transit case 2. Thereby the turnbuckle(s) 16 operate to clamp each of the transit case(s) 2 and case lid(s) 28 upon one another into a unitary structure, significantly reducing the tension strength required in the individual case lid(s) 28, hinges and or latches. Coupled together via the turnbuckle (s) 16, the transit case(s) 2 and turnbuckle(s) 16 create a direct load path from the antenna mounting surface 4 to ground. No joints with possible eccentricities, such as fasteners passing through the top and or bottom of the transit case(s) 2 are present. Preferably, where the attachment point(s) 15 are formed as a non-through hole cavity, no holes penetrate through to the interior of any transit case 2. Thereby, the transit case environmental integrity is maximized.

Figure 6:
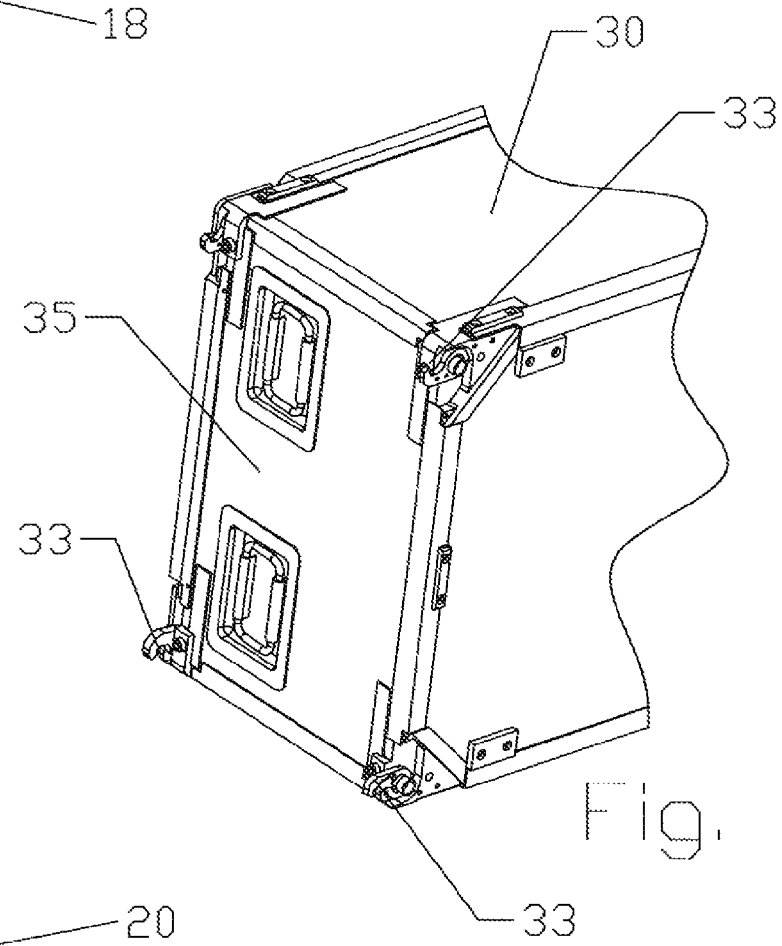
FIG. 6 is a schematic isometric close-up view of the proximal end portion of a lateral transit case, with latch covers removed for clarity.

To increase the overall stability of the antenna support 1, for example where the size of the reflector dish 12 or other antenna element is maximized, the footprint of the antenna support 1 may be expanded via the addition of lateral transit case(s) 30 attached to sides of the top and bottom transit case(s) 2. As shown in FIG. 6, the attachment to the bottom transit case 2 sidewall 32 may be via cam latch(s) 33 positioned at a proximal end 35 of each lateral transit case 30. A horizontal stiffening strut 34 may be applied extending from a node 22 at the top of the near corner turnbuckle 16 to an attachment point 15 on each of the lateral transit case(s) 30. The horizontal stiffening strut 34 length may be adjusted, for example, via a threaded portion 18.

Figure 7:
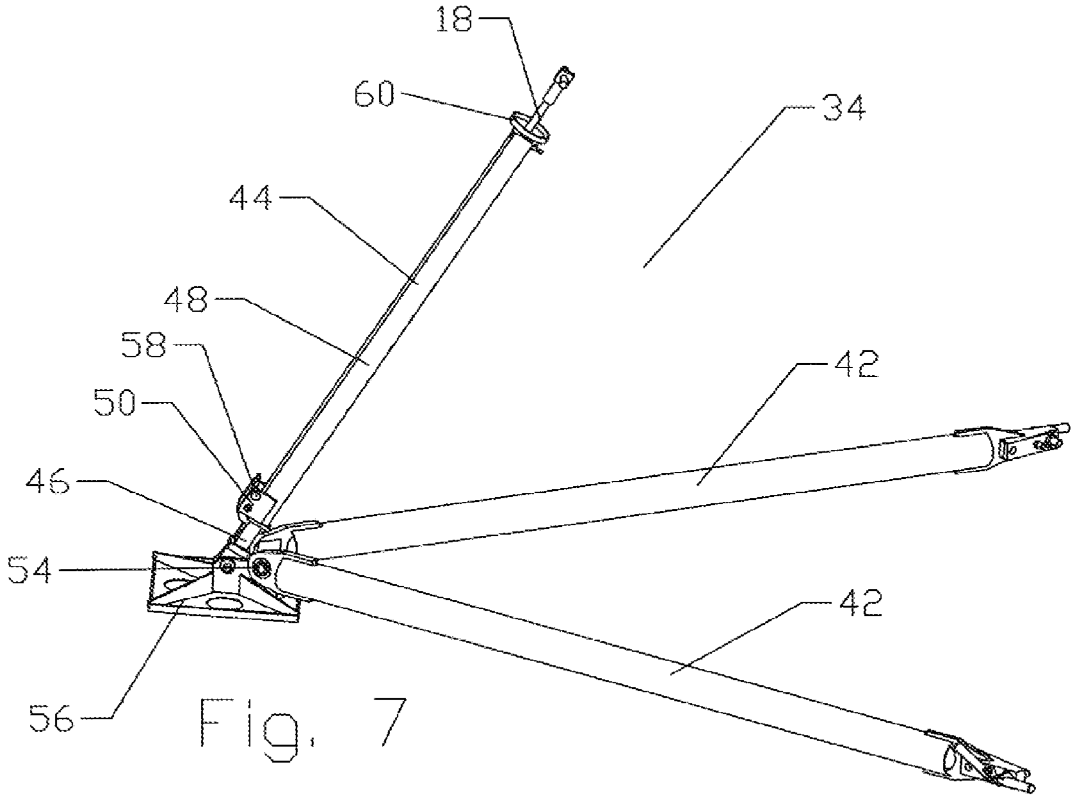
FIG. 7 is a schematic isometric view of the front outrigger stabilizing strut.
Figure 8:
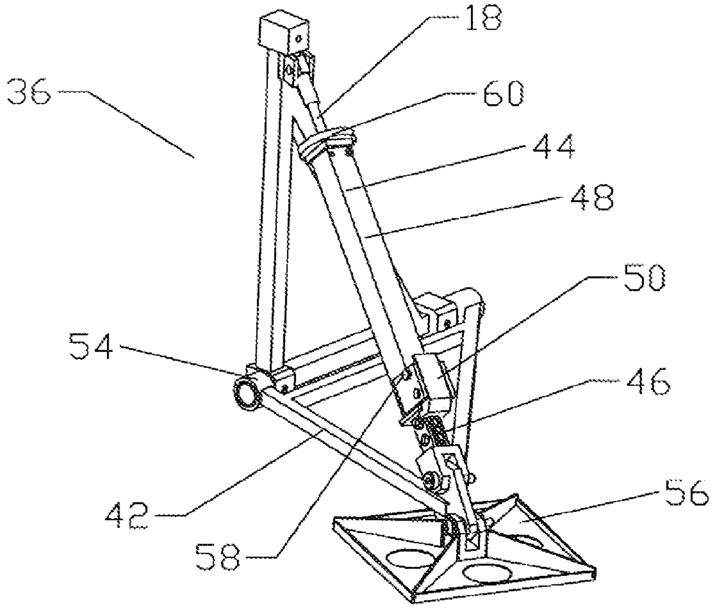
FIG. 8 is a schematic isometric view of a lateral transit case outrigger stabilizing strut.

An outrigger stabilizing strut 36 may be applied extending from a front corner 38 of the antenna support 1 and from the distal end 40 of each lateral transit case 30 to provide a maximum triangular footprint and quick and precision leveling functions. The front corner 38 outrigger stabilizing strut 36, best shown in FIG. 7, attaches via three connections: a node 22 at the top of the front corner 38 turnbuckle 16 and via two bottom leg(s) 42 to attachment point(s) 15 in the respective sides of the bottom transit case 2. Each of the lateral transit case 30 distal end 40 outrigger stabilizing strut(s) 36, for example as shown in FIG. 8, also attaches via three corner points, via for example cam latches 33, of the respective lateral transit case 30 distal end 40 to the respective corners of a support frame 44 which also operates to reinforce the distal end 40 of each lateral transit case 30.

The outrigger stabilizing strut(s) 36 quick leveling function is operable via an adjustable arm 44 having an inner sleeve 46 telescopable within an outer sleeve 48. A pivoting ratchet mechanism 50 of the outer sleeve 48 engages any of a plurality of aperture(s) 52 of the inner sleeve 46 to quickly extend or retract the adjustable arm 44 length in increments equal to the aperture 52 spacing and thereby via pivoting linkage connection(s) 54 adjust the height of a base 56 at the outrigger stabilizing strut distal end relative to the bottom of the support structure. The ratchet mechanism 50 may include a locking pin 58 or other form of safety mechanism to prevent accidental release of the ratchet mechanism 50 once the desired length has been selected.

The precision leveling function of the outrigger stabilizing strut(s) 36 is provided by threading of a nut 60 onto a threaded portion 18, the nut 60 extending the threaded portion 18 into and out of the outer sleeve 48 to adjust the length of the adjustable arm 44 with high resolution. Thereby, the outrigger stabilizing strut(s) 36 may be quickly adjusted via the pivoting ratchet mechanism 50 to roughly level the antenna support 1 and then finally adjusted with high resolution via the threaded portion(s) 18 and nut(s) 60.

Figure 9:
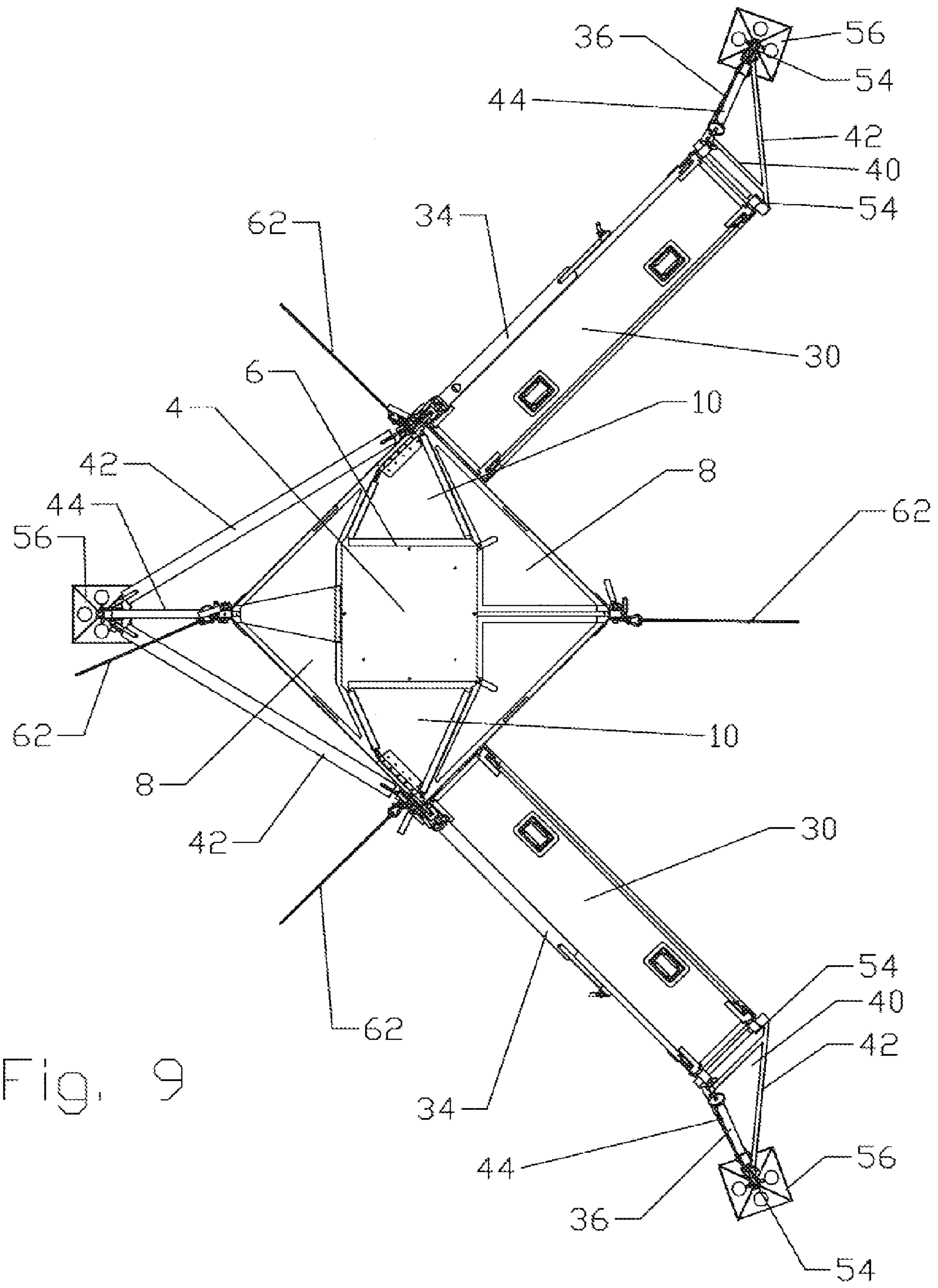
FIG. 9 is a schematic top view of an antenna support configured with ground wires.
Figure 10:
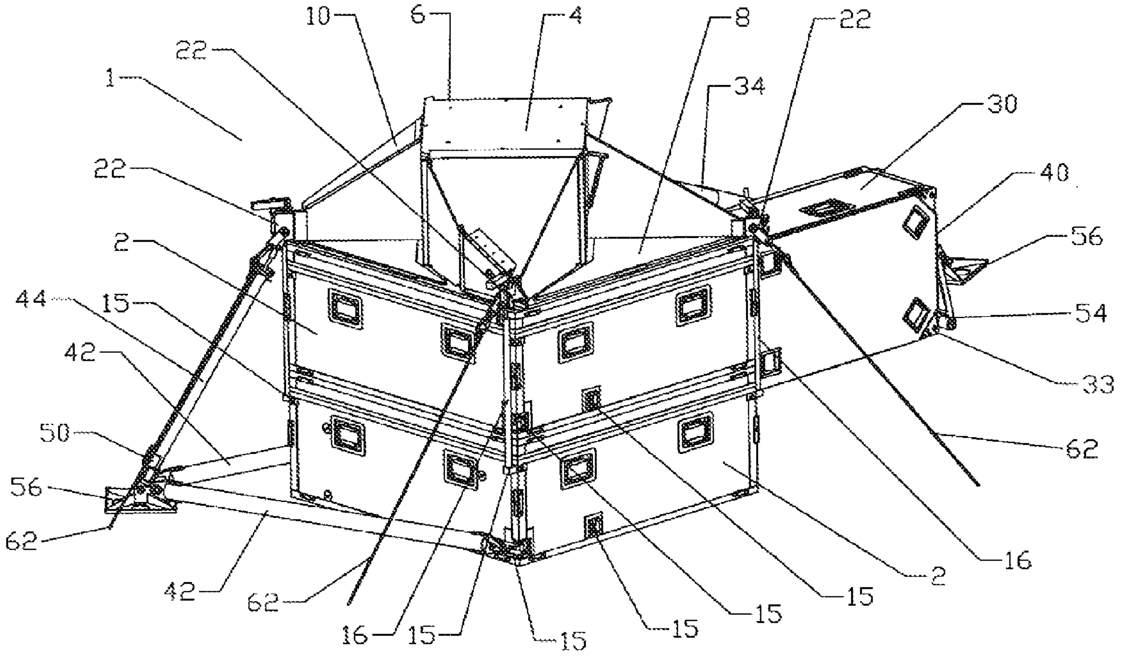
FIG. 10 is a schematic isometric side view of an antenna support configured with ground wires, one lateral transit case assembly removed for clarity.
Figure 11:
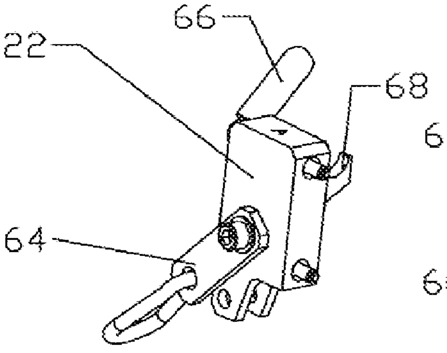
FIG. 11 is a schematic isometric connection side view of a front corner node configured for use with a ground wire.
Figure 12:
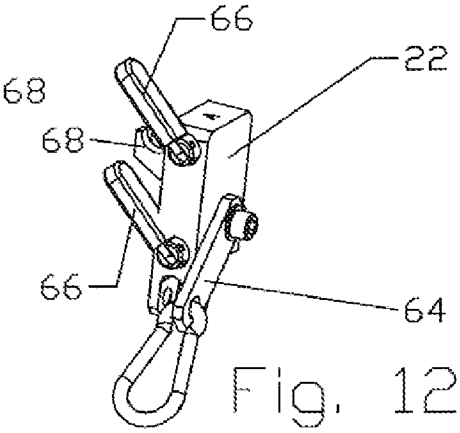
FIG. 12 is a schematic isometric front side view of the front corner node of FIG. 11.
Figure 13:
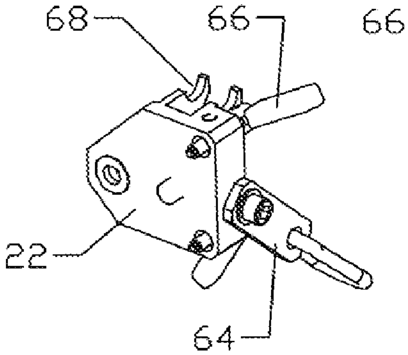
FIG. 13 is a schematic isometric connection side view of a side corner node configured for use with a ground wire.
Figure 14:
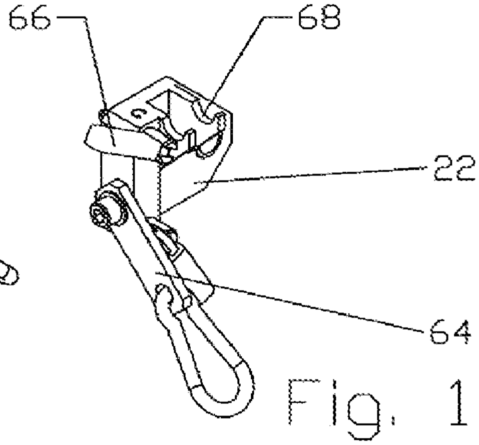
FIG. 14 is a schematic isometric front side view of the front corner node of FIG. 13.
Figure 15:
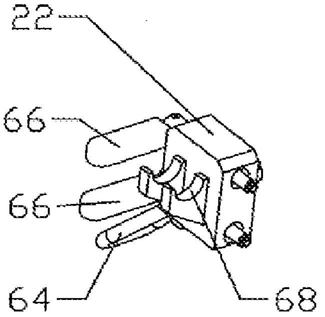
FIG. 15 is a schematic isometric connection side view of a back corner node configured for use with a ground wire.
Figure 16:
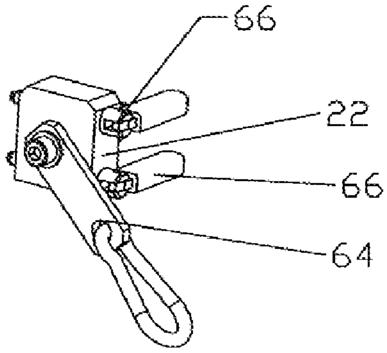
FIG. 16 is a schematic isometric front side view of the back corner node of FIG. 15.

In a second embodiment, as shown in FIGS. 9-10, ground wire(s) may be added for additional stability. As demonstrated in FIGS. 11-16, the node(s) 22 may be formed optimized for each of front, side and rear positions with ground wire connections. Shoulder pin seat(s) may be applied to the node(s) 22 to remove the requirement for fully disassembling the turnbuckle(s) 16 to feed them through the node(s) 22. To ensure proper initial alignment, improve the ease of assembly and interconnection strength of the node(s) 22 to the top plate 8 and central mount 6, fastener(s) may be applied to interconnect the node(s) 22 with the top plate 8 and central mount 6 assembly.

In further embodiments, the transit case(s) 2 may be alternatively formed in other than cuboid configurations, such as cylindrical, partially cylindrical, octagonal or the like.

One skilled in the art will recognize that the present invention represents a significant improvement to the overall strength of prior mobile antenna support(s) 1 that also reduces the structural design requirements of the associated transit case(s) 2. Further, the solution provided is lightweight, compact and may be quickly assembled and disassembled by hand with minimal tool requirements. Thereby, improved cost, assembly and mobility efficiencies are realized.

TABLE OF PARTS

| | |
|---|---|
| 1 | antenna support |
| 2 | transit case |
| 4 | antenna mounting surface |
| 6 | central mount |
| 8 | top plate |
| 10 | reinforcing panel |
| 12 | reflector dish |
| 14 | positioning linkage |
| 15 | attachment point |
| 16 | turnbuckle |
| 17 | socket |
| 18 | threaded portion |
| 19 | bottom foot |
| 20 | rod portion |
| 22 | node |
| 24 | shoulder pin |
| 26 | coupling pin |
| 28 | case lid |
| 30 | lateral transit case |
| 32 | sidewall |
| 33 | cam latch |
| 34 | horizontal stiffening strut |
| 35 | proximal end |
| 36 | outrigger stabilizing strut |
| 38 | front corner |
| 40 | distal end |
| 42 | bottom leg |
| 44 | adjustable arm |
| 46 | inner sleeve |
| 48 | outer sleeve |
| 50 | ratchet mechanism |
| 52 | aperture |
| 54 | pivoting linkage connection |
| 56 | base |
| 58 | locking pin |
| 60 | nut |
| 62 | ground wire |
| 64 | ground wire connection |
| 66 | fastener |
| 68 | shoulder pin seat |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. An antenna support, comprising:

a top transit case stacked upon a bottom transit case;

an antenna mounting surface stacked upon the top transit case;

the bottom transit case, the top transit case and the antenna mounting surface retained by a plurality of turnbuckle(s);

each of the turnbuckle(s) coupling between a respective attachment point of the bottom transit case and the antenna mounting surface;

a length of the turnbuckle(s) adjustable to clamp the top transit case against the bottom transit case and the antenna mounting surface against the top transit case;

wherein the antenna mounting surface is a top plate with angled reinforcing panels supporting a raised central mount spaced away from the top plate.

2. The antenna support of claim 1, wherein the mounting of each turnbuckle at the antenna mounting surface is via a node.

3. The antenna support of claim 2, wherein the node includes a shoulder pin seat and a ground wire connection.

4. The antenna support of claim 1, wherein at least one of the turnbuckle(s) is positioned proximate a corner of the bottom transit case.

5. The antenna support of claim 4, wherein each of the top and bottom transit cases are rectangular, side corners of the top and bottom transit cases aligned parallel with one another; and the plurality of turnbuckles is four turnbuckle(s), one of turnbuckle positioned proximate each of the side corners.

6. The antenna support of claim 1, wherein the attachment point of the bottom transit case is formed as a non-through hole cavity.

7. The antenna support of claim 1, wherein the turnbuckle(s) have a threaded portion that threads into a rod portion.

8. The antenna support of claim 1, wherein the top transit case is keyed to the bottom transit case by bottom feet of the top transit case that fit into sockets of the bottom transit case.

9. The antenna support of claim 1, further including a lateral transit case coupled to a sidewall of the bottom transit case.

10. The antenna support of claim 9, wherein the lateral transit case couples to the sidewall of the bottom transit case via a plurality of cam latches.

11. The antenna support of claim 9, further including a horizontal stiffening strut coupled between one of the node(s) and the lateral transit case.

12. The antenna support of claim 1, further including an outrigger stabilizing strut with at least one bottom leg coupled to the bottom transit case and an adjustable arm coupled to one of the node(s); the at least one bottom leg, the adjustable arm and a base coupled to a pivoting linkage connection.

13. The antenna support of claim 1, wherein the adjustable arm is provided with an inner sleeve telescopable within an outer sleeve; and a ratchet mechanism operable to retain a selected inner sleeve position with respect to the outer sleeve.

14. The antenna support of claim 9, further including an outrigger stabilizing strut with at least one bottom leg coupled to a support frame and an adjustable arm coupled to support frame; the at least one bottom leg, the adjustable arm and a base coupled to a pivoting linkage connection; the support frame coupled to a distal end of the lateral transit case.

15. The antenna support of claim 14, wherein the support frame is coupled to the distal end of the lateral transit case by a plurality of cam latches.

16. The antenna support of claim 1, wherein the attachment between the turnbuckle(s) and the respective attachment point(s) is a coupling pin snap connection into the attachment point.

17. An antenna support, comprising:

a cuboid top transit case stacked upon a cuboid bottom transit case;

an antenna mounting surface stacked upon the top transit case;

the antenna mounting surface provided with a top plate and angled reinforcing panels supporting a raised central mount spaced away from the top plate;

the top and bottom transit cases aligned with side corners parallel with one another;

one turnbuckle positioned proximate each of the side corners, coupling between a respective non-through hole cavity attachment point of the bottom transit case and a node at the antenna mounting surface;

a length of the turnbuckle(s) adjustable to clamp the top transit case against the bottom transit case and the antenna mounting surface against the top transit case;

a lateral transit case coupled to a sidewall of the bottom transit case via a plurality of cam latches;

a horizontal stiffening strut coupled between one of the node(s) and the lateral transit case; and an outrigger stabilizing strut with at least one bottom leg coupled to the bottom transit case and an adjustable arm coupled to one of the node(s); the at least one bottom leg, the adjustable arm and a base coupled to a pivoting linkage connection.

18. The antenna support of claim 17, wherein each node includes a shoulder pin seat and a ground wire connection.

19. The antenna support of claim 17, further including an outrigger stabilizing strut with at least one bottom leg coupled to a support frame and an adjustable arm coupled to support frame; the at least one bottom leg, the adjustable arm and a foot coupled to a pivoting linkage connection; the support frame coupled to a distal end of the lateral transit case.

* * * * *